(12) United States Patent
Chen et al.

(10) Patent No.: US 7,957,754 B2
(45) Date of Patent: Jun. 7, 2011

(54) METHOD AND SYSTEM FOR AUTHENTICATING SHORT MESSAGE CALLING PARTY

(75) Inventors: Youjun Chen, Shenzhen (CN); Zujian Li, Shenzhen (CN); Guofan Tong, Shenzhen (CN); Weihua Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 957 days.

(21) Appl. No.: 11/622,786

(22) Filed: Jan. 12, 2007

(65) Prior Publication Data

US 2007/0149225 A1 Jun. 28, 2007

Related U.S. Application Data

(63) Continuation of application No. PCT/CN2006/001018, filed on May 18, 2006.

(30) Foreign Application Priority Data

May 20, 2005 (CN) .......................... 2005 1 0070896

(51) Int. Cl.
*H04Q 7/20* (2006.01)

(52) U.S. Cl. ........ 455/466; 455/410; 455/416; 455/425; 455/433; 455/445; 379/120; 379/126

(58) Field of Classification Search .................. 455/410, 455/416, 425, 433, 466, 445; 379/120, 126
See application file for complete search history.

(56) References Cited

U.S. PATENT DOCUMENTS

| | | | |
|---|---|---|---|
| 7,139,568 B2 | 11/2006 | Kim | |
| 7,218,712 B2 * | 5/2007 | de Nicolas et al. | ............ 379/120 |
| 2001/0029182 A1 * | 10/2001 | McCann et al. | .............. 455/433 |
| 2002/0119793 A1 * | 8/2002 | Hronek et al. | ................ 455/466 |

(Continued)

FOREIGN PATENT DOCUMENTS

CN 1387342 A 12/2002

(Continued)

OTHER PUBLICATIONS

ETSI Global System for Mobile Communications 3GPP, Digital Cellular Telecommunications System (Phase 2+); Universal Mobile Telecommunications System (UMTS); Support of GSM Motile Number Portability (MNP) State 2 (3GPP TS 23.066 version 7.0.0 Release 7); ETSI TS 123 066 V7.0.0 (Jun. 2007).
3GPP "Global System for Mobile Communications 3GPP," 3rd Generation Partnership Project; Technical Specification Group Core Network; Mobile Application Part (MAP) Specification (Release 1998); 3GPP TS 09.02 V7.15.0 (Mar. 2004).

*Primary Examiner* — Marivelisse Santiago-Cordero
*Assistant Examiner* — Xiang Zhang
(74) *Attorney, Agent, or Firm* — Leydig, Voit & Mayer, Ltd.

(57) ABSTRACT

A method for authenticating a Short Message (SM) calling party, including: if a Signal Relay Function for support of Mobile Number Portability (MNP-SRF) module detects a calling party number carried in an SM belongs to its serving network after receiving a Mobile Originated (MO) SM, the MNP_SRF module adds an identifier of the MNP_SRF module's network to the calling party number. A Short Message Serving Center (SMSC) determines whether the SM passes calling party authentication according to the fact that whether the calling party number carries an identifier of the SMSC's network. The invention provides a system for authenticating an SM calling party, including: a Mobile Switching Center (MSC), a calling MNP_SRF module, a Number Portability Database (NPDB) and a Short Message Serving Center (SMSC). The invention may avoid a mobile number having subscribed to a new network from using resources of the SMSC of a network to which the subscription has been canceled.

10 Claims, 3 Drawing Sheets

| U.S. PATENT DOCUMENTS | | | | FOREIGN PATENT DOCUMENTS | | |
|---|---|---|---|---|---|---|
| 2004/0053610 A1 | 3/2004 | Kim | | CN | 1578500 A1 | 2/2005 |
| 2005/0064882 A1 | 3/2005 | Bragado Carrasco et al. | | CN | 100433850 C | 11/2008 |
| 2005/0078660 A1* | 4/2005 | Wood | 370/352 | WO | WO 03/051075 A1 | 6/2003 |
| 2005/0078809 A1* | 4/2005 | Nicolas et al. | 379/120 | WO | WO 03/067855 A2 | 8/2003 |
| 2005/0143076 A1* | 6/2005 | Machida et al. | 455/445 | | | |
| 2007/0149225 A1 | 6/2007 | Chen et al. | | | | |

* cited by examiner

METHOD AND SYSTEM FOR AUTHENTICATING SHORT MESSAGE CALLING PARTY

This application is a continuation of International Patent Application No. PCT/CN2006/001018, filed May 18, 2006, which claims priority to Chinese Patent Application No. 2005/0070896.1, filed May 20, 2005, all of which are hereby incorporated by reference.

FIELD OF THE TECHNOLOGY

The present invention relates to mobile communication technologies, and more particularly, to a method and a system for authenticating a Short Message (SM) calling party.

BACKGROUND OF THE INVENTION

A Mobile Number Portability (MNP) is a capability provided for users by a network, which enables a mobile user to change his/her subscribed network without changing his/her Mobile Station International Integrated Services Digital Network Number (MSISDN).

The most internationally popular MNP solution is a Signaling Relay Function for support of MNP (MNP-SRF) provided by the European Telecommunication Standard Institute (ETSI) for the signal relay mode of Global System for Mobile communications (GSM) systems. According to the technical solution in accordance with embodiments of the present invention is that: setting an MNP-SRF module in a GSM signaling network and configuring data on switches or other devices associated with the MNP in the GSM signaling network. Thus, when a key Mobile Application Part (MAP) message carrying an E.164 number passes the MNP-SRF module, the MNP-SRF module can inquire about the Number Portability NP) state of the MSISDN from a Number Portability Database (NPDB), and then perform appropriate subsequent processing according to the NP state. FIG. 1 is a schematic diagram illustrating the location of the MNP-SRF module in a network and interaction between the MNP-SRF module and other network entities. As shown in FIG. 1, the MNP-SRF module is located on a Signal Transfer Point (STP).

FIG. 2 is a schematic diagram illustrating a message flow for processing a Mobile Originated (MO) message according to the prior art, the detailed steps are as follows.

Steps 201~202, a Mobile Station (MS) submits an SM and address information of a Short Message Serving Center (SMSC) to its serving-Mobile Switching Center (MSC), then the MSC requests the subscription data of the MS from a Visited Location Register (VLR) via the MO SM Transfer message.

The address information of the SMSC is stored in a Subscriber Identity Module (SIM) of the MS. When the MS cancels a subscription from one network and subscribes to another, the address information of the SMSC needs to be modified manually, i.e., the address information of the SMSC stored in the SIM needs to be modified from the network to which the subscription has been canceled to the newly subscribed one.

When the MS moves to a certain region, a Home Location Register (HLR) corresponding to the MS will send the subscription data of the MS to the serving-VLR of the MS, and the subscription data includes the mobile number of the MS.

Steps 203~207, the VLR returns subscription data of the MS to the MSC, and the MSC sends to the SMSC the mobile number of the MS, i.e., the calling party number, together with the SM. The SMSC determines whether the MS is a subscriber of its own according to the calling party number. If the MS is a subscriber of the SMSC, the SMSC determines that the SM passes calling party authentication and sends the SM to the called party. If the MS is not a subscriber of the SMSC, the SMSC determines that the SM fails in calling party authentication and discards the SM.

It can be seen from the process shown in FIG. 2 that, after an MS cancels a subscription from a network A and a mobile number, such as the MSISDN, is carried to a newly subscribed network B, if the MS still reserves the address information of the SMSC of network A, there may be problems as follows.

The SMSC generally authenticates an MS according to a number segment that a mobile number belongs to, if the signaling network of network A and that of network B are inter-working networks, the MS subscribing to network B can still pass the authentication of the SMSC in network A to which the MS has canceled the subscription. Therefore, the MS can freely use services and resources provided by the SMSC of network A to send SM, and meanwhile, the MS cannot send SM via the SMSC of newly subscribed network B since the MS cannot pass the authentication of the SMSC of newly subscribed network B. This obviously results in an unreasonable utilization of SM serving resources. For example, after a mobile number de-subscribing from network A of China Mobile in Shenzhen, it subscribes to network B of China Mobile in Beijing. Since the signaling networks of networks A and B are inter-working networks, the MS will still use the SMSC of network A to send SM if the MS reserves the address information of the SMSC of network A, and the MS cannot send SM via the SMSC of network B since it cannot pass the authentication of the SMSC of network B.

If the signaling networks of network A and network B are not inter-working networks, the MS keeping the address information of the SMSC of network A to which the subscription has been canceled will be unable to use a Short Message Service (SMS). For example, since the signaling networks of China Mobile and China Unicom are not inter-working networks, if a mobile number cancels the subscription from one of the signaling networks, network A, and subscribes to the other network, network B, the MS will not be able to use the SMS. The reason is that the SM originated by the MS, i.e. the MO SM, cannot penetrate the newly subscribed signaling network B to reach the SMSC located in network A to which it has canceled the subscription.

SUMMARY OF THE INVENTION

The present invention is directed to inter-network communication. More particularly, the invention provides a method and a system for authenticating a Short Message (SM) calling party.

According to an embodiment of the present invention, a method for authenticating a Short Message (SM) calling party, including:

a Signal Relay Function for support of Mobile Number Portability (MNP-SRF) module receives a Mobile Originated (MO) SM from a Mobile Switching Center (MSC);

the MNP-SRF module determines whether a calling party number carried in the SM is a mobile number of the MNP_SRF module's home network, if the calling party number carried in the SM is a mobile number of the MNP_SRF module's home network, adds an identifier of the MNP_SRF module's network to the calling party number;

the MNP_SRF module sends the SM to a Short Message Serving Center (SMSC);

the SMSC determines whether the calling party number in the SM carries the identifier of the SMSC's network, if the calling party number in the SM carries the identifier of the SMSC's network, determines that the SM passes calling party authentication; if the calling party number in the SM does not carry the identifier of the SMSC's network, determines that the SM fails to pass calling party authentication.

According to an embodiment of the present invention, a system for authenticating a Short Message (SM) calling party, including:

a Mobile Switching Center (MSC), a calling Signal Relay Function for support of Mobile Number Portability (MNP_SRF) module, a Number Portability Database (NPDB) and a Short Message Serving Center (SMSC);

the MSC is configured to send an SM submitted by a Mobile Station (MS) and a mobile number of the MS, i.e., a calling party number, to the calling MNP_SRF module;

the calling MNP_SRF module is configured to obtain from the NPDB a Number Portability (NP) state of the calling party number sent by the MSC, and determine according to the NP state whether the calling party number is a number of a network where the calling MNP_SRF module located, if the calling party number is a number of the calling MNP_SRF module's network, add an identifier of the calling MNP_SRF module's network to the calling party number and send the calling party number and the SM to the SMSC; if the calling party number is not a number of the calling MNP_SRF module's network, directly send the SM and the calling party number sent by the MSC to the SMSC;

the NPDB is configured to send the NP state of a mobile number of the NPDB's network to the calling party MNP_SRF module according to a request of the MNP_SRF module;

the SMSC is configured to determine whether the calling party number sent by the calling MNP_SRF module carries the identifier of the SMSC's network, if the calling party number sent by the calling MNP_SRF module carries the identifier of the SMSC's network, determine that the SM from the calling MNP_SRF module passes calling party authentication, if the calling party number sent by the calling MNP_SRF module does not carry the identifier of the SMSC's network, determine that the SM from the calling MNP_SRF module fails to pass calling party authentication.

Many benefits are achieved by way of embodiments of the present invention over conventional techniques. For example, compared with the prior art, the MNP_SRF module adds an identifier of the MNP_SRF module's network to the calling party number of the SM of the MNP_SRF module's network in accordance with embodiments of the present invention. The SMSC determines whether the SM passes the authentication according to the identifier of the SMSC's network carried in the calling party number of the SM. Under the circumstances that the signaling networks are inter-working networks, if a mobile number still keeps the address information of the SMSC of a network to which the subscription has been canceled after subscribing to a new network, the mobile number cannot pass SM calling party authentication of the SMSC to which the subscription has been canceled when sending an SM to the SMSC since the MNP_SRF module does not add an identifier of the network to which the subscription has been canceled to the calling party number of the SM. Thus, a mobile number subscribed to a new network may be prevented from using resources, such as SMS resources, of the SMSC of a network to which the subscription has been canceled, and the SMS resources are reasonably utilized. Furthermore, the success rate of SM transmission is improved since the MNP_SRF module adds an identifier of the newly subscribed network to the calling party number of the SM when the mobile number executes an MO SM procedure to the SMSC of the newly subscribed SMSC, thus the mobile number can pass calling party authentication of the SMSC no matter whether the signaling networks are inter-working networks.

DETAILED DESCRIPTIONS OF THE INVENTION

According to embodiments of the present invention, the MNP_SRF module adds a network identifier to a calling party number which belongs to the MNP_SRF module's network. If the SMSC detects that the calling party number in the SM carries the identifier of the SMSC's network, the SMSC determines that the SM passes calling party authentication. It should be noted that, the network identifier is an identifier which can be used for identifying a network, and the network identifier can be expressed in any form not limited to a number identifier.

Figure 1:
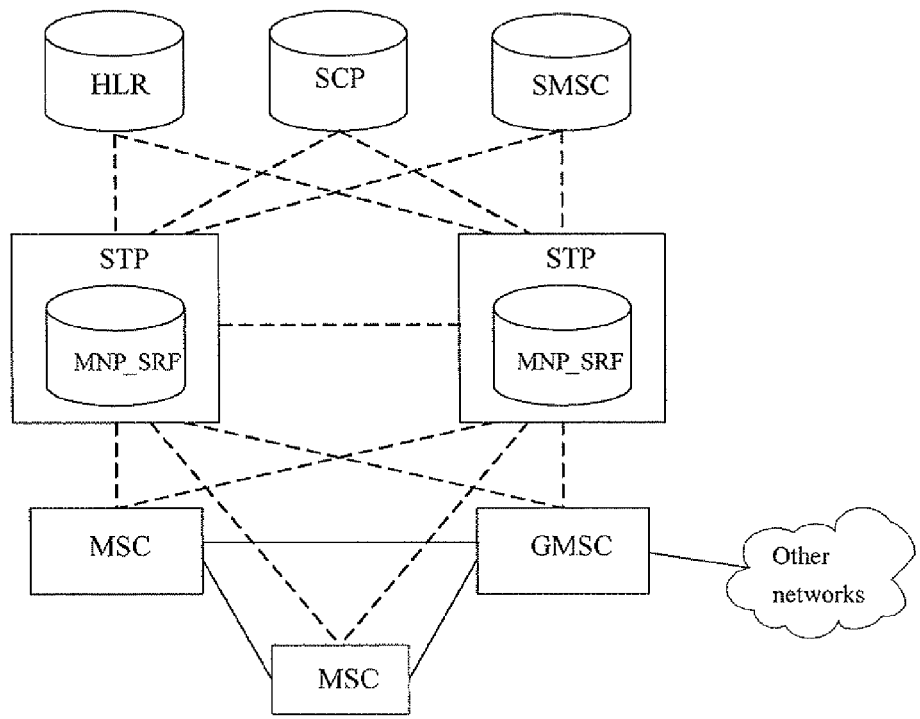
FIG. 1 is a schematic diagram illustrating the location of a MNP_SRF module in a network and interaction between the MNP_SRF module and other network entities.
Figure 2:
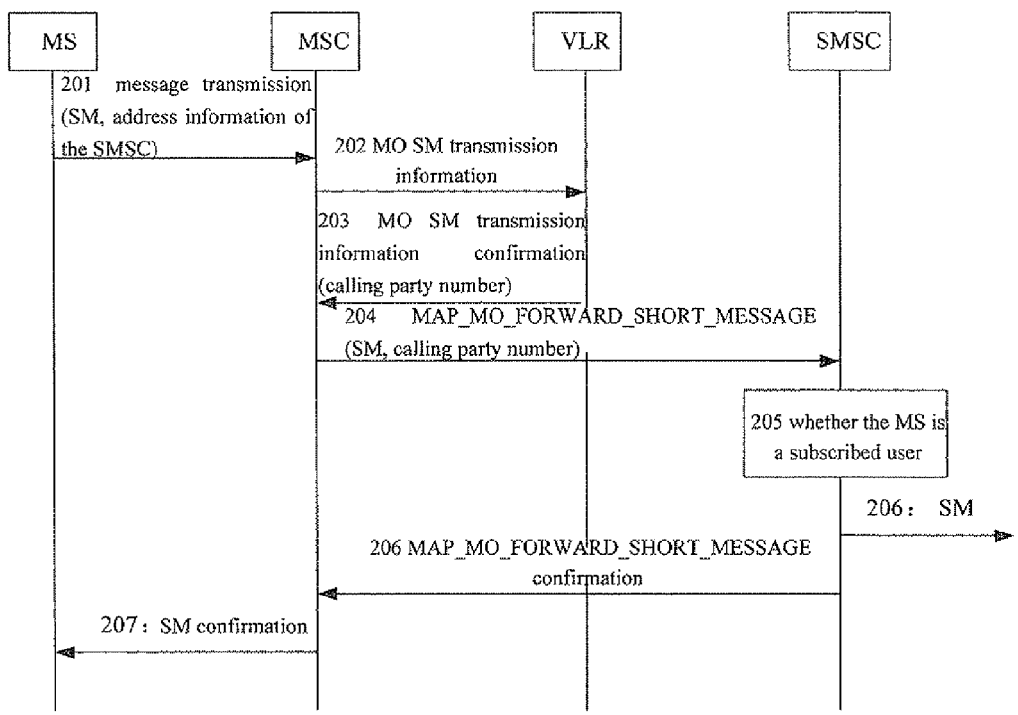
FIG. 2 is a schematic diagram illustrating a message flow for processing an MO SM according to the prior art.
Figure 3:
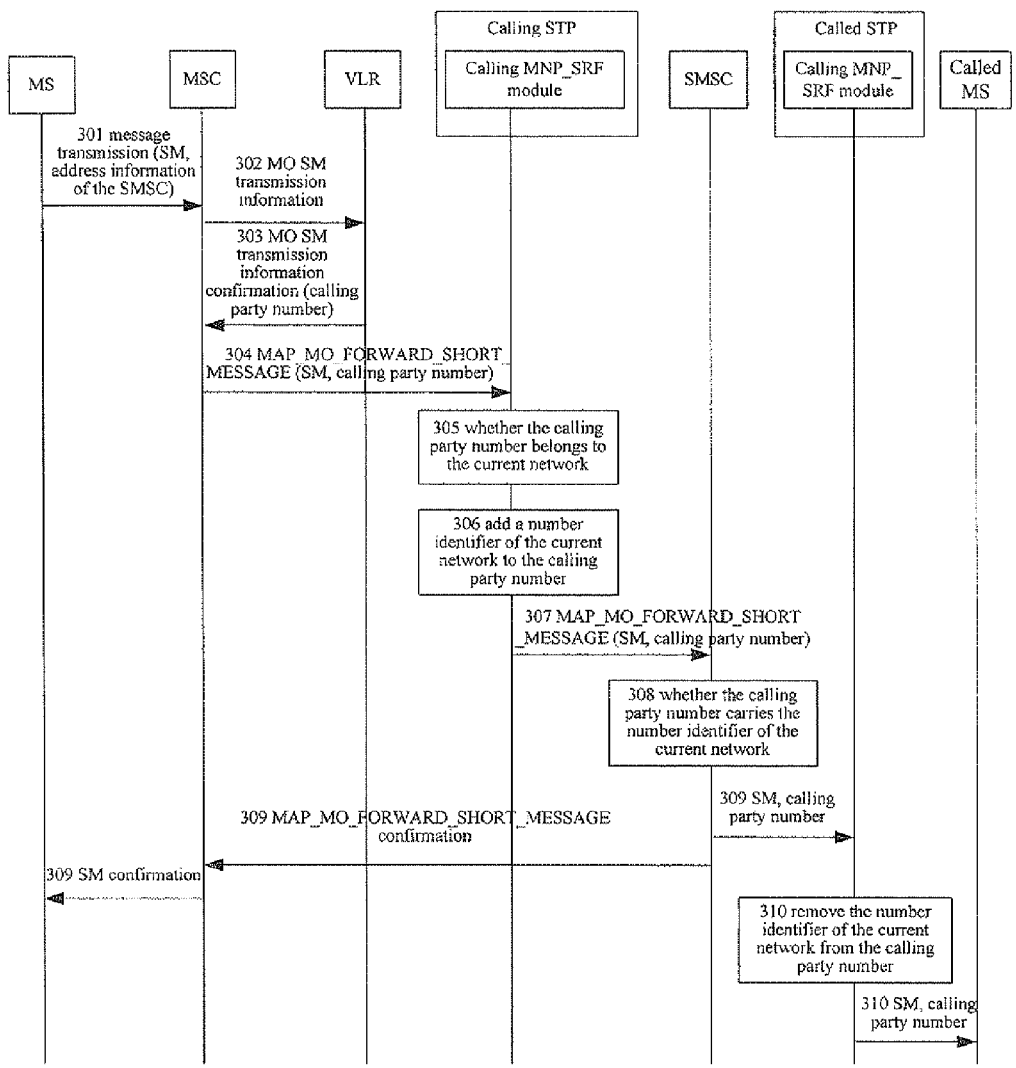
FIG. 3 is a schematic diagram illustrating a message flow of SM calling party authentication according to an embodiment of the present invention.

FIG. 3 is a schematic diagram illustrating a message flow of SM calling party authentication according to an embodiment of the present invention. As shown in FIG. 3, the authentication includes the following steps.

Step 301, a calling MS submits an SM and address information of the SMSC to its serving MSC through a Message Transfer message.

Step 302, upon receiving the SM, the MSC sends a MAP_SEND_INFO_FOR_MO_SMS message to the VLR to request for the subscription data of the calling MS.

Step 303, upon receiving the MAP_SEND_INFO_FOR_MO_SMS message, the VLR returns the subscription data including the mobile number of the calling MS, i.e. the subscription data of the calling number.

Step 304, the MSC sends the SM, the calling party number and the address information of the SMSC to the calling STP through a MAP_MO_FORWARD_SHORT_MESSAGE.

Step 305, after the calling STP receives the SM and the calling party number, the calling MNP_SRF module located in the calling STP determines according to the NP state of the calling party number obtained from the NPDB whether the calling party number is a mobile number of the MNP_SRF module's network, i.e., whether the calling party number is a mobile number carried into the MNP_SRF module's network from a foreign network or is a mobile number of the MNP_SRF module's network which has not been carried to a foreign network. If the calling party number is a mobile number of the calling MNP_SRF module's network, go to step 306, otherwise, directly go to step 307.

The NPDB stores the NP states of all the mobile numbers of the NPDB's network. The NP state of a mobile number includes a mobile number carried into the NPDB's network from a foreign network, i.e., a mobile number which has canceled a subscription from another network and subscribed to the NPDB's network, a mobile number of the NPDB's network which has not been carried to a foreign network, i.e., a mobile number which keeps subscribing to the NPDB's network. The MNP_SRF module may obtain the NP state of the mobile number of the MNP-SRF module's network at a pre-configured interval; or, the MNP_SRF module may inquire the NPDB about the NP state of the calling party number after receiving the SM and the calling party number from the MSC.

Step 306, the calling MNP_SRF module adds an identifier of the calling MNP_SRF module's network to the calling party number.

The identifier of the calling MNP_SRF module's network is predetermined by the SMSC, and stored in the MNP_SRF module and the SMSC of the calling MNP_SRF module's network respectively. The location of the added identifier of the calling MNP_SRF module's network in the calling party number is also predetermined by the SMSC, and stored in the MNP_SRF module and the SMSC of calling MNP_SRF module's respectively. Specifically speaking, the identifier of the calling MNP_SRF module's network may be taken as a prefix or a postfix of the calling party number, or the identifier of the calling MNP_SRF module's network may be added to other locations in the calling party number predetermined by the SMSC of the calling MNP_SRF module's network.

Step 307, the calling STP sends the SM and the calling party number to the SMSC through a MAP_MO_FORWARD_SHORT_MESSAGE.

Step 308, upon receiving the SM and the calling party number, the SMSC determines whether the calling party number carries an identifier of the SMSC's network, if the calling party number carries an identifier of the SMSC's network, go to step 309, if the calling party number does not carry an identifier of the SMSC's network, the SMSC determines that the SM fails to pass calling party authentication, discards the SM and ends the procedure.

Step 309, the SMSC determines that the SM passes calling party authentication, sends the SM and the calling party number to the called STP.

Step 310, after the called STP receives the SM and the calling party number, the called MNP_SRF module located in the called STP removes the identifier of the SMSC's network in the calling party number, and sends the SM and the calling party number to the called MS.

In this step, the called MNP_SRF module located in the called STP removes the identifier of the SMSC's network in the calling party number so as to normally display the calling party number on the called MS.

In practical applications, the calling STP and the called STP may be one STP or different STPs. If they are one STP, the calling MNP_SRF module and the called MNP_SRF module are the same MNP_SRF module.

It can be seen that, when a mobile number, such as an MSISDN, is carried from a network A to which the subscription has been canceled to a newly subscribed network B, the address information of the SMSC set in the MS may still be the address information of the SMSC of network A to which the subscription has been canceled, but the MS will not use the SM resources of the SMSC of network A to which the subscription has been canceled. The reason is that, if network A and network B are inter-working networks, the MNP_SRF module will not add an identifier of network A to the calling party number when the MS initiates an SM procedure to the SMSC of network A because the calling party number carried in the SM does not belong to network A, thus the SM will not pass calling party authentication. Therefore, the MS will not use the serving resources of the SMSC of network A. Meanwhile, when a mobile number is carried to a newly subscribed network B from network A to which the subscription has been canceled, the situation that the MS cannot use the resources of the SMSC of network B due to being unable to pass calling party authentication of the newly subscribed network B may be avoided. The reason is that, when the MS initiates an SM procedure to the SMSC of network B, the MNP_SRF module detects that the calling party number carried in the SM is a mobile number carried into the MNP_SRF module's network from a foreign network, therefore it adds an identifier of network B to the calling party number, and the SM can pass calling party authentication.

Figure 4:
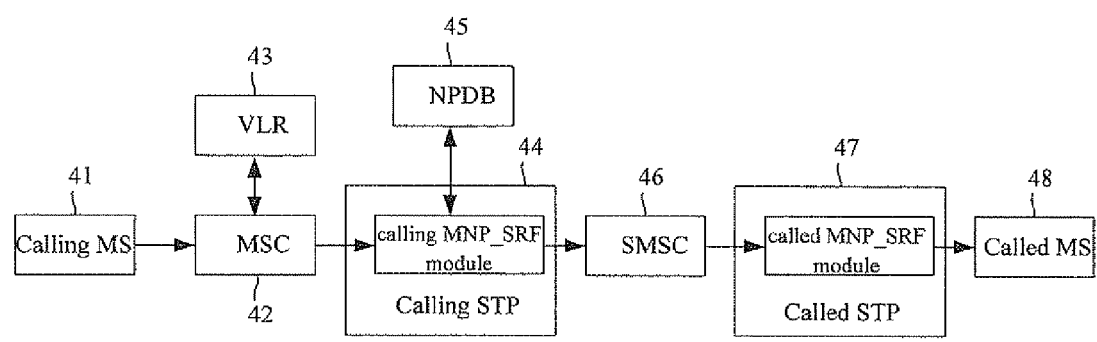
FIG. 4 is a schematic diagram illustrating structure of an SM calling party authenticating system according to an embodiment of the present invention.

FIG. 4 is a schematic diagram illustrating structure of an SM calling party authenticating system according to an embodiment of the present invention. As shown in FIG. 4, the system includes:

a calling MS 41, an MSC 42, a VLR 43, a calling STP 44 which includes a calling MNP_SRF module, an NPDB 45, an SMSC 46, a called STP 47 which includes a called MNP_SRF module, and a called MS 48.

The calling MS 41 is configured to submit an SM and address information of the SMSC to the MSC 42.

The MSC 42 is configured to send a subscription data request to the VLR 43 after receiving the SM from the MS 41, and send the mobile number of the calling MS 41, i.e., the calling party number, the SM and the address information of a Short Message Center (SMC) in the subscription data returned by the VLR 43 to the calling STP 44.

The VLR 43 is configured to return corresponding subscription data to the MSC 42 after receiving the subscription data request from the MSC 42.

In practical applications, the MSC 42 and the VLR 43 can be located in the same entity.

The calling STP 44 is configured to determine whether the calling party number belongs to the calling MNP_SRF module's network according to the NP state of the calling party number obtained by the MNP_SRF module from the NPDB 45, after receiving the SM and the calling party number from the MSC 42, wherein the MNP_SRF module belongs to the calling STP 44. If the calling party number belongs to the calling MNP_SRF module's network, the calling STP 44 adds an identifier of the calling MNP_SRF module's network to the calling party number, and sends the calling party number carrying the identifier of the calling MNP_SRF module's network and the SM to the SMSC 46; otherwise, directly sends the SM and the calling party number received from the MSC 42 to the SMSC 46.

The NPDB 45 is configured to send the NP state of a mobile number which belongs to the NPDB's network to the calling STP 44.

The SMSC 46 is configured to determine, after receiving an SM and a calling party number from the STP 44, whether the calling party number carries the identifier of the SMSC's network, if the calling party number carries the identifier of the SMSC's network, the SMSC 46 determines that the SM passes calling party authentication; if the calling party number does not carry the identifier of the SMSC's network, determines that the SM fails to pass calling party authentication, and discards the SM.

The called STP 47 is configured for indicating the called MNP_SRF module of the called STP 47 to remove the identifier of the SMSC's network from the calling party number after receiving the SM and the calling party number from the SMSC 46, and then sending the calling party number and the SM to the called MS 48.

In practical applications, the calling STP 44 and the called STP 47 may be one STP or different STPs. If they are one STP, the calling MNP_SRF module and the called MNP_SRF module are the same MNP_SRF module.

The called MS 48 is configured to receive the SM and the calling party number sent by the called STP 47.

The forgoing descriptions are only the preferred embodiments of the present invention and are not used to limit the present invention. Any modification, equivalent replacement or improvement made under the spirit and principles of this invention should be covered within the protection scope of this invention.

What is claimed is:

1. A method for authenticating a Short Message (SM) calling party, comprising:
   receiving, by a Signal Relay Function for support of Mobile Number Portability (MNP-SRF) module, a Mobile Originated (MO) SM from a Mobile Switching Center (MSC);
   obtaining from a Number Portability Database (NPDB) a Number Portability (NP) state of a calling party number carried in the SM;
   determining according to the NP state whether the calling party number carried in the SM is a mobile number of the MNP_SRF module's home network, when the calling party number carried in the SM is a mobile number of the MNP_SRF module's home network, adding an identifier of the MNP_SRF module's home network to the calling party number;
   sending, by the MNP_SRF module, the SM to a Short Message Serving Center (SMSC);
   determining, by the SMSC, whether the calling party number in the SM carries the identifier of the MNP_SRF module's home network, if the calling party number in the SM carries the identifier of the MNP_SRF module's home network, determining that the SM passes calling party authentication; if the calling party number in the SM does not carry the identifier of the MNP_SRF module's home network, determining that the SM fails to pass calling party authentication.

2. The method of claim 1, wherein the step of determining according to the NP state whether the calling party number carried in the SM is a mobile number of the MNP_SRF module's home network by the MNP_SRF module comprises:
   if the NP state of the calling party number returned by the NPDB shows that the calling party number is a mobile number carried into the MNP_SRF module's home network from a foreign network or is a mobile number of the MNP_SRF module's home network that has not been carried to a foreign network, determining that the calling party number is a mobile number of the MNP_SRF module's home network; if the NP state returned by the NPDB does not show that the calling party number is a mobile number carried into the MNP_SRF module's home network from a foreign network or is a mobile number of the MNP_SRF module's home network that has not been carried to a foreign network, determining that the calling party number is not a mobile number of the MNP_SRF module's home network.

3. The method of claim 1, further comprising:
   requesting, by the MSC, subscription data of the MS from a Visited Location Register (VLR) after receiving the SM from the MS;
   sending, by the MSC, the calling party number in the subscription data returned by the VLR and the SM from the MS to the MNP_SRF module.

4. The method of claim 1, wherein the step of adding an identifier of the MNP_SRF module's home network to the calling party number by the MNP_SRF module comprises:
   taking, by the MNP_SRF module, the identifier of the MNP_SRF module's home network as prefix information or postfix information of the calling party number.

5. The method of claim 1, wherein the step of adding an identifier of the MNP_SRF module's home network to the calling party number by the MNP_SRF module comprises:
   adding the identifier of the MNP_SRF module's home network to a location of the calling party number predetermined by the SMSC.

6. The method of claim 1, further comprising:
   after determining by the SMSC the SM passes calling party authentication, sending, by the SMSC, the SM and the calling party number to a MNP_SRF module to which the called party belongs;
   removing, by the MNP_SRF module to which the called party belongs, the identifier of the MNP_SRF module's home network from the calling party number, and sending the calling party number and the SM to the called party.

7. A system for authenticating a Short Message (SM) calling party, comprising:
   a Mobile Switching Center (MSC), a calling Signal Relay Function for support of Mobile Number Portability (MNP_SRF) module, a Number Portability Database (NPDB) and a Short Message Serving Center (SMSC); wherein
   the MSC is configured to send an SM submitted by a Mobile Station (MS) and a mobile number of the MS, i.e., a calling party number, to the calling MNP_SRF module;
   the calling MNP_SRF module is configured to obtain from the NPDB a Number Portability (NP) state of the calling party number sent by the MSC, and determine according to the NP state whether the calling party number is a number of a network where the calling MNP_SRF module located, when the calling party number is a number of the calling MNP_SRF module's home network, add an identifier of the calling MNP_SRF module's home network to the calling party number and send the calling party number and the SM to the SMSC; if the calling party number is not a number of the calling MNP_SRF module's home network, directly send the SM and the calling party number sent by the MSC to the SMSC;
   the NPDB is configured to send the NP state of a mobile number of its own network to the calling party MNP_SRF module according to a request of the MNP_SRF module;

the SMSC is configured to determine whether the calling party number sent by the calling MNP_SRF module carries the identifier of the SMSC's network, if the calling party number sent by the calling MNP_SRF module carries the identifier of the SMSC's network, determine that the SM from the calling MNP_SRF module passes calling party authentication, if the calling party number sent by the calling MNP_SRF module does not carry the identifier of the SMSC's network, determine that the SM from the calling MNP_SRF module fails to pass calling party authentication.

8. The system of claim 7, wherein the calling MNP_SRF module is located in a Signaling Transfer Point (STP).

9. The system of claim 7, further comprising:
a called MNP_SRF module, configured to remove the identifier of the SMSC's network from the calling party number after receiving the calling party number from the SMSC, and send the SM sent by the SMSC and the calling party number to the called party.

10. The system of claim 7, wherein the calling MNP_SRF module is further configured to remove the identifier of the calling MNP_SRF module's home network from the calling party number after receiving the calling party number from the SMSC, and send the SM sent by the SMSC and the calling party number to the called party.

* * * * *